United States Patent [19]
McCutchen

[11] Patent Number: 5,688,377
[45] Date of Patent: *Nov. 18, 1997

[54] ROTARY RADIAL CYCLONIC FLUID MIXTURE SEPARATOR

[76] Inventor: Wilmot H. McCutchen, P.O. Box 701129, Houston, Tex. 77270

[*] Notice: The term of this patent shall not extend beyond the expiration date of Pat. No. 5,275,006.

[21] Appl. No.: 344,885

[22] Filed: Nov. 25, 1994

Related U.S. Application Data

[63] Continuation-in-part of Ser. No. 207,800, Mar. 7, 1994, Pat. No. 5,534,118, which is a continuation of Ser. No. 929,286, Aug. 13, 1992, abandoned.

[51] Int. Cl.[6] .................................................. B01D 3/10
[52] U.S. Cl. .......................... 202/205; 202/237; 202/238; 203/11; 422/211; 210/321.68; 210/360.1; 210/380.1; 55/406
[58] Field of Search .................................. 422/209, 211, 422/212; 210/360.1, 380.1, 382, 381, 512.3, 787, 321.68; 55/406, 408, 409, 411; 202/205, 237, 238; 203/11, 22, DIG. 17

[56] References Cited

U.S. PATENT DOCUMENTS

| | | | |
|---|---|---|---|
| 3,717,554 | 2/1973 | Ruthrof | 202/238 |
| 3,779,452 | 12/1973 | Nau et al. | 233/32 |
| 3,837,491 | 9/1974 | Humiston et al. | 202/238 |
| 3,964,884 | 6/1976 | Judith | 55/184 |
| 3,973,930 | 8/1976 | Burgess | 55/41 |
| 3,998,610 | 12/1976 | Leith | 95/35 |
| 4,162,195 | 7/1979 | Solyom et al. | 210/15 |
| 4,193,775 | 3/1980 | Wang | 95/35 |
| 4,225,324 | 9/1980 | Gazda | 95/35 |
| 4,278,450 | 7/1981 | Hurst | 95/270 |
| 4,292,051 | 9/1981 | Kime | 95/35 |
| 4,311,570 | 1/1982 | Cowen et al. | 422/209 |
| 4,361,490 | 11/1982 | Saget | 95/270 |
| 4,362,536 | 12/1982 | Gullichsen | 55/52 |
| 4,468,234 | 8/1984 | McNicholas | 95/270 |
| 4,516,987 | 5/1985 | Niggemann | 55/52 |
| 4,597,835 | 7/1986 | Moss | 202/238 |
| 4,666,564 | 5/1987 | Zeitsch | 202/238 |
| 4,698,156 | 10/1987 | Bumpers | 210/331 |
| 4,877,424 | 10/1989 | Perkola et al. | 55/406 |
| 4,906,370 | 3/1990 | Galaj et al. | 210/321.67 |
| 4,925,557 | 5/1990 | Ahlberg et al. | 210/321.68 |
| 4,936,990 | 6/1990 | Brunsell et al. | 210/360.1 |
| 4,938,868 | 7/1990 | Nelson | 203/1 |
| 5,073,262 | 12/1991 | Ahlberg et al. | 210/321.68 |
| 5,275,006 | 1/1994 | McCutchen | |
| 5,334,358 | 8/1994 | Schuchardt et al. | 422/209 |
| 5,534,118 | 7/1996 | McCutchen | 202/205 |

OTHER PUBLICATIONS

Robinson, "Coherent Motions in the Turbulent Boundary Layer," *Ann. Rev. Fluid Mech.*, vol. 23 pp. 601–639 (1991).
Donald R. Olander, "The Gas Centrifuge", *Scientific American*, vol. 239, No. 2, pp. 37–43, Aug. 1978.

*Primary Examiner*—Christopher Kim

[57] ABSTRACT

Rotating parallel disks create radial cyclonic vortices between them. The axes of these vortices communicate with the bore of a hollow shaft, and a vacuum is drawn in the shaft bore by the action of a centrifugal pump. Particles, mist, and heavy vapors such as mercury, are separated out of a gas stream by the radial vortices, which cause whatever is relatively heavy in the vortex to migrate away from the vortex axis and then contact the rotating disks, whereby they are expelled from the space between the disks. Application to mist elimination for steam is discussed, as are application to cyclonic cracking of hydrocarbons and separation of gaseous waste from intra-lattice fluid.

13 Claims, 2 Drawing Sheets

ROTARY RADIAL CYCLONIC FLUID MIXTURE SEPARATOR

This application is a continuation-in-part of Ser. No. 08/207,800, filed Mar. 7, 1994, U.S. Pat. No. 5,534,118, which is a file wrapper continuation of 07/929,286 filed Aug. 13, 1992, now abandoned.

BACKGROUND

Prior Art

Cyclonic scrubbers known to the art of gas separation are static devices having no moving parts. For example, in the type of dust collector commonly used, a polluted gas stream is jetted into a cylinder having a tapering diameter, so that the jet speeds up as it descends the cylinder. Axially disposed within this cylinder is an ascending chamber, which tapers in as the gas rises through it. Dust is centrifugated to the wall of the cylinder and drops to collection in a hopper disposed below the ascending chamber. Such devices are ineffective for particles smaller than 10 microns. Re-entrainment of dust from the hopper is a problem, and so is caking of the surfaces, especially where vapors are in the stream.

Various other designs are known for scrubbing a fluid stream by arcuate jet paths, e.g. for removing entrained mist from steam.

Wet scrubbers cause the polluted gas to pass through a liquid, so that the liquid contact with the contaminants causes them to separate out of the stream.

Electrostatic precipitators and filtration in baghouses are the alternative means for gas purification.

A need exists for a gas scrubber that will be compact, easily cleaned, and suitable for handling gas streams with fluctuating characteristics produced by cyclic combustor operations. The particles and mercury in these gas streams are known to be health hazards. Volatile organic chemicals (VOC's), such as benzene, toluene, and xylene, are prohibited emissions as well, and a need exists for treatment methods that do not involve disposal of contaminated filters.

Cyclonic liquid separators, such as the hydrocyclone used for oil-water separation, are also static devices.

Catalytic conversion of heavy hydrocarbons into lower molecular weight products, e.g. gasoline, is carried out in static packed columns. The catalyst becomes coated with tar and must be removed for cleaning. A static boundary layer, with high product concentration, remains close to the catalyst, retarding the rate of conversion.

SUMMARY OF THE PRESENT INVENTION

Rotatable parallel disks are disposed approximately perpendicular to a hollow shaft, such that an afferent mesial passage, extending from the disk rims to the shaft bore, allows for flow of fluid radially inward as the disks rotate. The disks are preferably plated with a catalyst. The bore of the shaft communicates with a centrifugal impeller, which draws a vacuum in the hollow shaft and thus provides means for maintaining fluid flow radially inward between the disks and then through the bore of the shaft.

Preferably the disks rotate in opposite directions, so as to set up radial vortices between them, these radial vortices having their axes of rotation in the plane between the disks. The drag of the disks imparts vorticity to the fluid within the afferent mesial passage, and the low pressure sink created by the impeller, acting through the shaft bore, stretches these vortices and accelerates their rotation.

Particles, vapors, and whatever is relatively dense in the fluid stream is centrifugated in these radial vortices, migrating away from the vortex axis. Thus the vortices cause such dense components to impinge on the disk surfaces, whereupon the rotation of the disk in contact with such dense components impels them away from the shaft bore and out of the space between the disks. The desired light components are able to continue radially inward along the axes of the radial vortices due to their relative low density, while the undesired heavy components are brought into contact with the disk surfaces and are expelled from the afferent mesial passage.

The transport mechanism outlined in the preceding paragraph not only separates the light from the heavy components but it also provides means for removing light product from the disk surfaces while simultaneously bringing heavy reactant to contact with the disk for reaction. Controlled turbulence, i.e. the radial vortices, increases the efficiency of catalytic processing.

In gas scrubbing applications, mist and vapors condense by impingement pressure against the disks, and the condensate is accelerated by the disks radially outward. In use for steam treatment, high-quality steam is sucked through the vortices, with mist and condensable vapor ejected.

OBJECTS AND ADVANTAGES

It is an object of this device to provide high-temperature collection of mercury vapor, volatile organic chemicals, and respirable particulate matter of less than 10 microns in diameter from a gas stream produced by cyclic combustor operations, such as powerplants and diesel engines.

A cyclonic fluid scrubber according to the present design is extremely simple and rugged and may be used with high-temperature flue gases. It is compact and easy to keep clean.

The impeller which draws a vacuum in the device would provide means for creating an artificial draft for combustion, making tall chimneys unnecessary. Pollutants would not be discharged to the upper atmosphere.

It is also an object of this invention to provide means for fluid separation to proceed simultaneously in the same device with fluid treatment, e.g. cracking by catalysts. The object is to remove light product from contact with treatment surfaces while refluxing heavy reactant against those treatment surfaces. The desired light products of cracking proceed up the axes of the radial vortices while the heavy components of the stream are spun out to contact the catalytic surfaces for cracking or ejection. Examples of application include gasoline production and intra-lattice reactions: in both cases the light component of the fluid stream (gaseous waste products in the intra-lattice fluid, gasoline in the crude oil) is removed from the space between the disks continuously while the unreacted dense component is caused to contact the disk surfaces.

DETAILED DESCRIPTION OF THE PREFERRED EMBODIMENT

Figure 1:
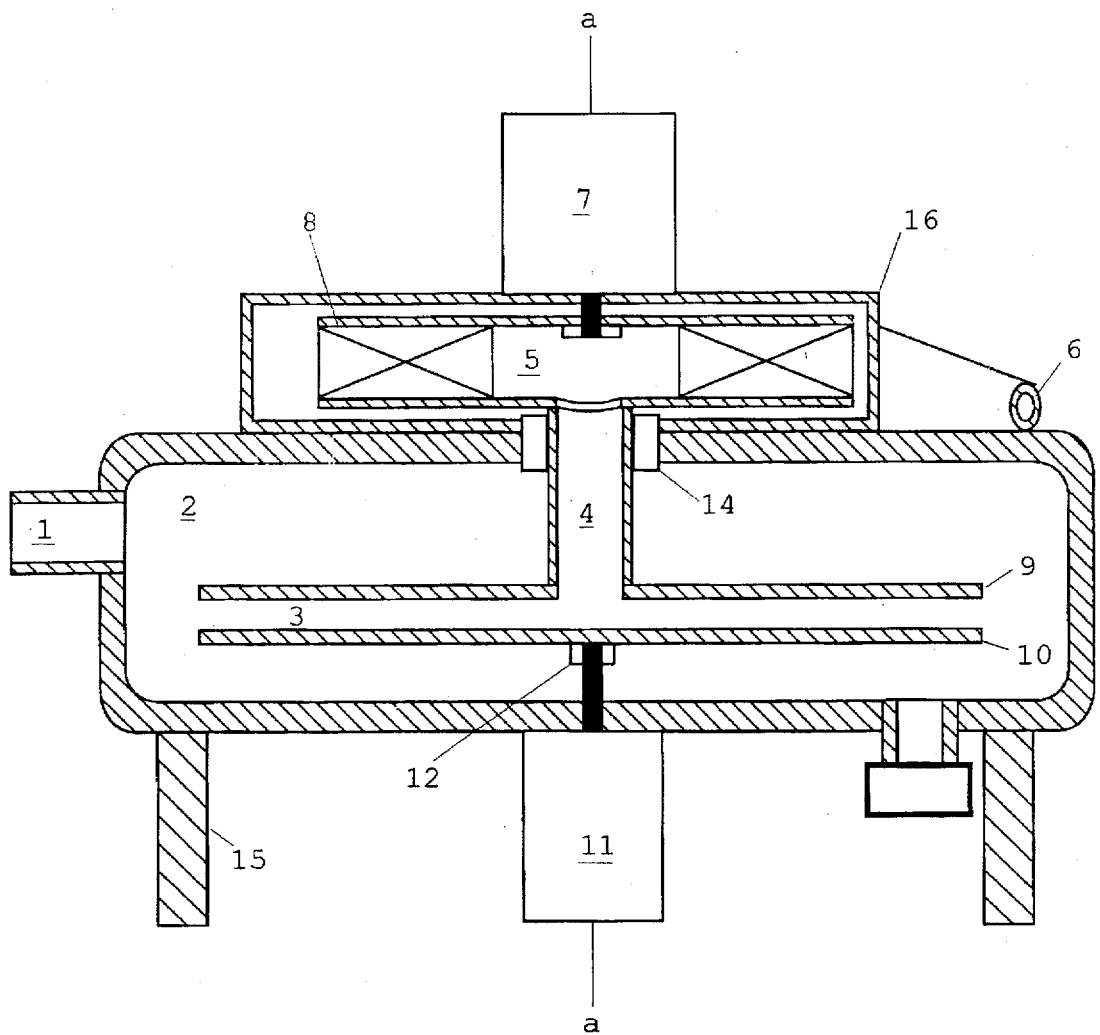
FIG. 1 shows a sectional elevational view of the preferred embodiment of a rotary radial cyclonic fluid mixture separator according to the present invention.

FIG. 1 shows a cross-sectional view of the preferred embodiment of the present invention, an apparatus for cyclonic separation of a fluid mixture, such as a gas stream, a mixed phase stream, or a mixture of heavy and light liquid components. Fluid to be treated enters a tank (2) through a feed conduit (1). The tank is supported by supports (15). Disposed within the tank are rotatable disks (9, 10), the disks defining between them an afferent mesial passage (3). The disks rotate about the axis (a—a). The afferent mesial passage communicates with a centrifugal pump (5) through a hollow shaft (4) having a bore, the shaft having its centerline along the axis (a—a). Thus fluid within the tank may follow a path through the afferent mesial passage, into the bore, through the centrifugal pump, and out a discharge port (6).

Motors (7, 11) cause the disks (9, 10) to rotate about the axis (a—a). The disks act as impellets to the fluid due to drag of the fluid against the disks. The bottom motor (11) connects to a flange (12) which is fixed to the bottom disk (10). The top motor (7) connects to the centrifugal pump, and the pump connects to the shaft, which connects to the top disk (9). A seal (14) prevents fluid leakage along the shaft as the shaft rotates within the tank.

The disks preferably rotate in opposite directions at the same speed. Vortices form in the fluid within the afferent mesial passage, at least some of these vortices having axes radial to the axis (a—a). The radial vortex axes communicate with the shaft bore (4).

Fluid within the afferent mesial passage is rotated by the radial vortices. The relatively less dense components of the fluid pass along the axes of the radial vortices, while the relatively dense components are spun out of the vortices until they contact the surface of the rotating disks. The disk surfaces defining the afferent mesial passage are preferably plated with a catalyst that causes the relatively dense components to react and convert into light product that can pass through the radial vortices.

Fluid to be treated could be flue gas having particulate matter and/or volatile organic chemicals and/or mercury vapor. The centrifugal pump creates a flow of gas through the shaft bore (4).

The rotation of the disks creates drag in the gas between them at the same time that the centrifugal blower is creating flow toward the shaft bore. Thus cyclonic vortices form, having their axis of rotation approximately parallel to the disks. The centrifugal force of the cyclonic vortices impels particles and vapors, which are more dense than pure gas, against the disks as they rotate.

Figure 2:
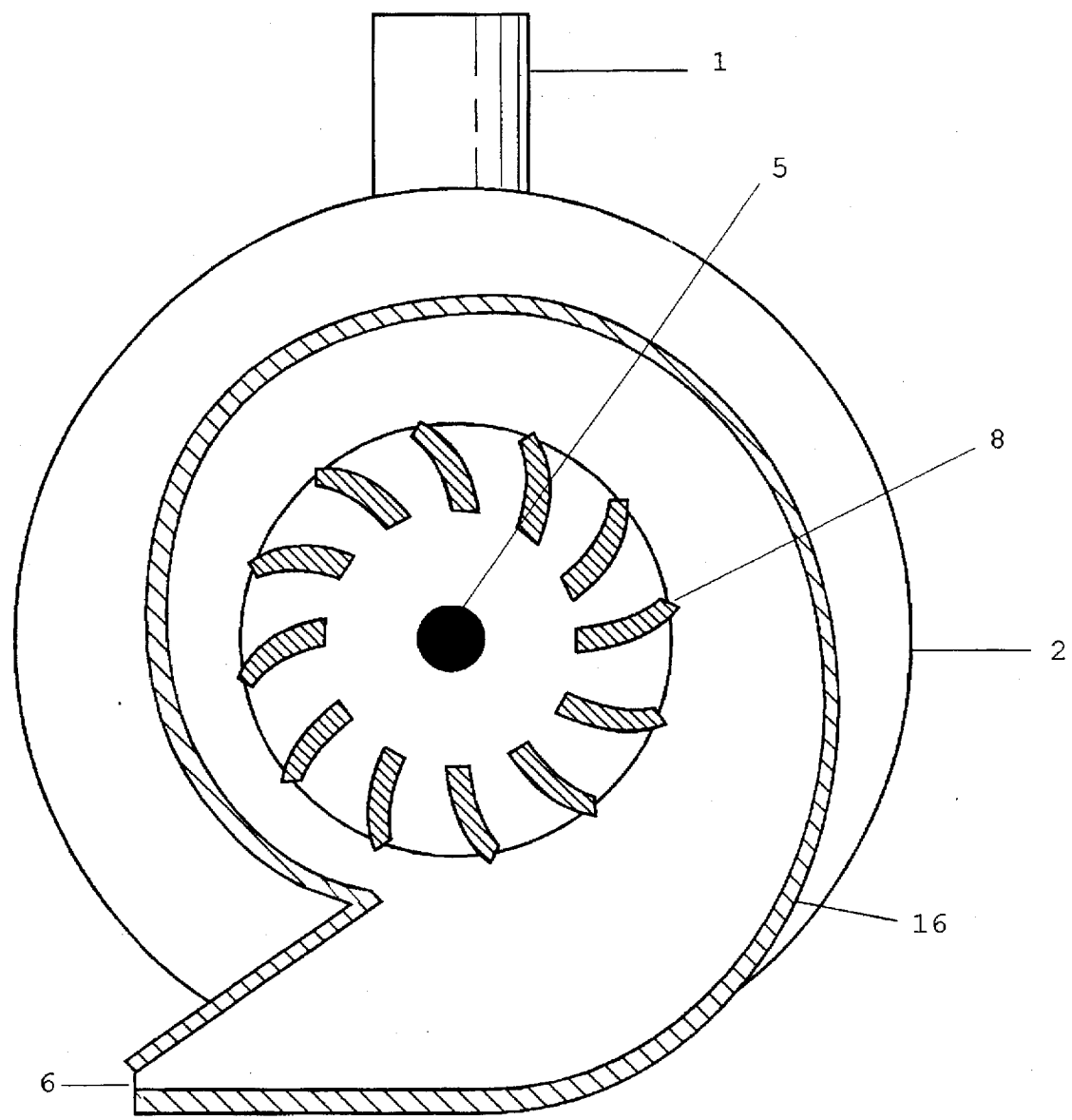
FIG. 2 shows a top sectional view of the preferred embodiment.

FIG. 2 shows a top sectional view of the preferred embodiment of the present invention shown in FIG. 1. The effluent, for example, scrubbed flue gas, scrubbed steam, or cracked hydrocarbons, is impelled through the shaft bore (4) into the eye of the centrifugal pump (5) by the rotation of the pump vanes (8). A volute wall (16) guides the effluent into the discharge port (6).

OPERATION, RAMIFICATIONS AND SCOPE

To improve the operation of the present invention used as a flue gas scrubber, means for scraping the disks are added in order to remove accumulated deposits of soot and condensate. The scraping of the disks also creates an electrostatic charge, which aids separation. The rotation of the disks and the friction of the scrapers causes the deposits on the disks to shear off and roll up the surface of the scrapers outward from the shaft.

Dynamic cyclonic catalytic cracking of heavy hydrocarbons proceeds as follows: the heavy reactant flow comes through the feed conduit (1) and is circulated in the afferent mesial passage by the rotation of the disks. The surfaces of the disks are plated with catalyst. Radial vortices within the afferent mesial passage cause centrifugal separation of the light product from the heavy reactant, and the vacuum drawn by the centrifugal pump causes the light product to migrate along the vortex axes to the shaft bore (4). The heavy reactant is brought into contact with the catalyst-plated disk surfaces by turbulent flow. Particles and tar are impelled by contact with the disks radially outward from the afferent mesial passage.

Turbulence improves the action of the catalyst-bearing surface by removing the boundary layer of product, while simultaneously transporting more reactant to contact.

Mist entrained in a gas stream is scrubbed out by cyclonic flow in the radial vortices. Liquid contacting the rotating disk surfaces is expelled from the afferent mesial passage. Only pure gas or vapor can proceed up the radial vortex axes due to its low relative density.

Mercury vapor, and/or vapor of volatile organic compounds, is condensed by impingement pressure against the disk surfaces, and then expelled by the rotation of the disks.

Particles in a fluid stream are cyclonically separated in the radial vortices and expelled by contact with the rotating disks.

High angular velocity, due to high motor speed or large disk diameters, would improve the operation of the device by increasing the vortex speed. The disks preferably rotate in opposite directions at the same speed.

Those skilled in the art upon reading the above detailed description of the present invention will appreciate that many modifications of the method and apparatus described above can be made without departing from the spirit of the invention. All such modifications which fall within the scope of the appended claims are intended to be covered thereby.

I claim:

1. Apparatus for separation of a gaseous fluid mixture, the apparatus comprising the combination of:
   (a) means for containing the gaseous fluid mixture, said containing means comprising an inlet for gaseous fluid mixture,
   (b) spaced-apart surfaces defining between them an afferent mesial passage said surfaces being rotatable with respect to each other,
   (c) means for rotating said rotatable surfaces in opposite directions about a common axis of rotation,
   (d) a shaft defining within it a bore, the bore fluidly communicating with the afferent mesial passage, and
   (e) means for effecting effluent flow from the afferent mesial passage to the bore and then out of the bore through a discharge port,
   the combined action of the rotating surfaces and said effluent flow effecting means creating at least one radial cyclonic vortex in the gaseous fluid mixture within the afferent mesial passage, the radial cyclonic vortex having its vortex axis within the afferent mesial passage and radial to the axis of rotation;
   whereby gaseous fluid mixture is centrifugated in the radial cyclonic vortex and entrained particles, mist, and vapor are thereby caused to contact the rotating surfaces, the contact accelerating particles, mist, and vapor, thereby ejecting them radially outward with respect to the axis of rotation, while effluent is transported by said effluent flow effecting means along the radial cyclonic vortex axis and through the bore of the shaft.

2. The apparatus of claim 1, and including catalyst upon the disks.

3. The apparatus of claim 1, wherein the containing means is a conduit for flue gas.

4. The apparatus of claim 1, wherein the effluent flow effecting means is a centrifugal pump.

5. The apparatus of claim 1, further comprising means for scraping the surfaces during rotation.

6. The apparatus of claim 1, wherein the surfaces are on oppositely rotatable parallel disks.

7. Apparatus for catalytic cracking of hydrocarbon reactant, comprising the combination of:
   (a) means for containing the reactant, said containing means comprising an inlet for influent reactant,
   (b) surfaces disposed within said means for containing reactant and defining between them an afferent mesial passage, at least one of said surfaces having catalyst upon it, and at least one of said surfaces being rotatable relative to the other surface,
   (c) a shaft defining within it a bore, the bore fluidly communicating with the afferent mesial passage and providing a path for effluent out of the afferent mesial passage,
   (d) means for effecting effluent flow, said effluent flow effecting means having an inlet fluidly communicating with the bore of the shaft and having a discharge port, and
   (e) means for rotating at least one of said surfaces about an axis of rotation and relative to the other surface,
   the combined effect of relative rotation of said surfaces and the effluent flow effecting means creating at least one radial cyclonic vortex within the afferent mesial passage, the radial cyclonic vortex having its vortex axis within the afferent mesial passage and radial to the axis of rotation.

8. The apparatus of claim 7, further comprising means for scraping the surfaces during rotation.

9. The apparatus of claim 7, wherein the surfaces are on oppositely rotatable parallel disks.

10. Apparatus for separating a fluid mixture, comprising the combination of:
    (a) means for containing the fluid mixture,
    (b) spaced-apart surfaces disposed within said containing means and defining between them an afferent mesial passage, at least one of said surfaces being rotatable relative to the other,
    (c) a shaft coaxial with the axis of rotation and defining a bore, the bore fluidly communicating with the afferent mesial passage,
    (d) effluent flow effecting means having an inlet fluidly communicating with the bore and having a discharge port for effluent, and
    (e) means for rotating at least one of said spaced-apart surfaces relative to the other about an axis of rotation as said effluent flow effecting means operates, thereby creating at least one radial cyclonic vortex within the afferent mesial passage, said vortex having an axis of rotation lying within the afferent mesial passage and radial to the axis of rotation, and said vortex axis communicating with the bore.

11. The apparatus of claim 10, further comprising means for scraping the surfaces during rotation.

12. The apparatus of claim 10, wherein the effluent flow effecting means is a centrifugal pump.

13. The apparatus of claim 10, wherein the surfaces are on oppositely rotatable parallel disks.

* * * * *